(12) United States Patent
Bunge et al.

(10) Patent No.: US 9,012,671 B2
(45) Date of Patent: Apr. 21, 2015

(54) PROCESS FOR PREPARING AMINO-MERCAPTO FUNCTIONAL ORGANOPOLYSILOXANES

(75) Inventors: David John Bunge, Midland, MI (US); Michael David Telgenhoff, Midland, MI (US); Arthur James Tselepis, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 389 days.

(21) Appl. No.: 13/513,278

(22) PCT Filed: Dec. 17, 2010

(86) PCT No.: PCT/US2010/060966
§ 371 (c)(1),
(2), (4) Date: Jun. 1, 2012

(87) PCT Pub. No.: WO2011/075624
PCT Pub. Date: Jun. 23, 2011

(65) Prior Publication Data
US 2012/0245373 A1    Sep. 27, 2012

Related U.S. Application Data

(60) Provisional application No. 61/287,811, filed on Dec. 18, 2009.

(51) Int. Cl.
*C07F 7/10* (2006.01)
*C08G 77/26* (2006.01)
*C08G 77/28* (2006.01)

(52) U.S. Cl.
CPC ............... *C08G 77/26* (2013.01); *C08G 77/28* (2013.01)

(58) Field of Classification Search
CPC ..................................................... C07F 7/1836
USPC ........................................................ 556/413
See application file for complete search history.

(56) References Cited

U.S. PATENT DOCUMENTS

2008/0207818 A1* 8/2008 Lu et al. ........................ 524/501

FOREIGN PATENT DOCUMENTS

| GB | 2108984 | 5/1983 |
| JP | 64-051468 | 2/1989 |
| JP | 2002-339258 | 11/2002 |
| JP | 2007-009216 | 1/2007 |
| WO | 2006121171 | 11/2006 |
| WO | 2006122018 | 11/2006 |

\* cited by examiner

*Primary Examiner* — Sudhakar Katakam
*Assistant Examiner* — Kofi Adzamli
(74) *Attorney, Agent, or Firm* — Patricia M. Scaduto; Alan Zombeck

(57) ABSTRACT

A method of making amino-mercapto functional organopolysiloxanes is disclosed by reacting (A) a dialkoxydialkylsilane, (B) an amino functional alkoxy silane, and (C) a mercapto functional alkoxy silane, via a condensation reaction. The amino-mercapto functional organopolysiloxanes products are useful in textile and fabric treatments.

12 Claims, No Drawings

PROCESS FOR PREPARING AMINO-MERCAPTO FUNCTIONAL ORGANOPOLYSILOXANES

CROSS REFERENCE TO RELATED APPLICATIONS

This application is a U.S. national stage filing under 35 U.S.C. §371 of PCT Application No. PCT/US10/60966 filed on Dec. 17, 2010, which claims the benefit of U.S. Provisional Patent Application No. 61/287,811 filed Dec. 18, 2009 under 35 U.S.C. §119 (e). PCT Application No. PCT/US10/60966, U.S. Provisional Patent Application No. 61/287,811 are hereby incorporated by reference.

TECHNICAL FIELD

This disclosure relates to a method of making such amino-mercapto functional organopolysiloxanes by reacting (A) a dialkoxydialkylsilane, (B) an amino functional alkoxy silane, and (C) a mercapto functional alkoxy silane, via a condensation reaction. The amino-mercapto functional organopolysiloxanes products are useful in textile and fabric treatments.

BACKGROUND

Amino-functional polysiloxanes are widely used in the textile industry as fibre lubricants and as fabric softeners and anti-wrinkle agents, and are also used in the personal care industry as hair conditioners and in skin care compositions. Mercapato-functional polysiloxanes are also known, and have been used in similar applications as amino-functional polysiloxanes. Organopolysiloxanes containing both amino functional and mercapto functional groups in the same polymer have recently been described in WO 2006/122018.

One of the major disadvantages of topical finishes prepared with fluorocarbon polymers is that they impart a harsh feel to the fabric surface. There is a need for textile treatment agents which impart oleophobicity and oil repellency to fabrics without imparting a harsh feel to the fabric surface, and preferably whilst at the same time imparting an improvement in feel compared to untreated fabric. Organopolysiloxanes containing both an amino and mercapto functional group are useful to prepare fluorosilicones for the treatment of fabrics, as described in WO 2006/121171. The resulting treatment renders textiles oleophobic, but yet have improved hand or feel compared to other fluoro treatments.

As amino-mercapto functional organopolysiloxane are becoming more useful as textile treatments, new industrial processes for their preparation are needed. In particular, processes are needed to enhance quality and consistency of the resulting product.

The present inventors have discovered a new method for preparing amino-mercapto functional organopolysiloxanes that provides such enhancements.

SUMMARY

This invention relates to an amino-mercapto functional organopolysiloxane comprising siloxy units having the average formula;

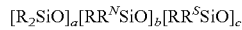

where; a is 1-4000, b is 1-1000, c is 1-1000,
R is independently a monovalent organic group,
$R^N$ is a monovalent amino functional organic group, and
$R^S$ is a monovalent mercapto functional organic group.

The invention further provides a method of making such amino-mercapto functional organopolysiloxanes by reacting:
(A) a dialkoxydialkylsilane,
(B) an amino functional alkoxy silane, and
(C) a mercapto functional alkoxy silane, via a condensation reaction.

The amino-mercapto functional organopolysiloxanes products are useful in textile and fabric treatments. The amino-mercapto functional organopolysiloxanes are also useful as a reactant with fluorocarbons to prepare a fluorosilicone compounds for imparting oil repellent properties (oleophobicity) to the textile with improved hand.

DETAILED DESCRIPTION

The amino-mercapto functional organopolysiloxanes of the present invention are organopolysiloxanes having at least one mercapto functional organic group and at least one amino functional organic group present in the molecule. As used herein, a "mercapto functional organic group" is any organic group containing a sulfur atom. An "amino functional organic group is an organic group containing a nitrogen atom.

Organopolysiloxanes are polymers containing siloxane units independently selected from $(R_3SiO_{0.5})$, $(R_2SiO)$, $(RSiO_{1.5})$, or $(SiO_2)$ siloxy units, where R may be any monovalent organic group. When R is a methyl group in the $(R_3SiO_{0.5})$, $(R_2SiO)$, $(RSiO_{1.5})$, or $(SiO_2)$ siloxy units of an organopolysiloxane, the siloxy units are commonly referred to as M, D, T, and Q units respectively. These siloxy units can be combined in various manners to form cyclic, linear, or branched structures. The chemical and physical properties of the resulting polymeric structures can vary. For example organopolysiloxanes can be volatile or low viscosity fluids, high viscosity fluids/gums, elastomers or rubbers, and resins depending on the number and type of siloxy units in the average polymeric formula. R may be any monovalent organic group, alternatively R is a hydrocarbon group containing 1 to 30 carbons, alternatively R is an alkyl group containing 1 to 30 carbon atoms, or alternatively R is methyl.

The amino-mercapto functional organopolysiloxanes of the present invention are characterized by having at least one of the R groups in the formula $R_nSiO_{(4-n)/2}$ be a mercapto group, and at least one of the R groups be an amino group. The amino functional group and mercapto functional group may be present on any siloxy unit having an R substituent, that is, they may be present on any $(R_3SiO_{0.5})$, $(R_2SiO)$, or $(RSiO_{1.5})$ unit.

The amino-functional organic group is designated in the formulas herein as $R^N$ and is illustrated by groups having the formula;

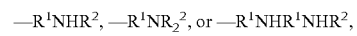

wherein each $R^1$ is independently a divalent hydrocarbon group having at least 1 carbon atom, and $R^2$ is hydrogen or an alkyl group. Each $R^1$ is typically an alkylene group having from 2 to 20 carbon atoms. $R^1$ is illustrated by groups such as; —CH$_2$CH$_2$—, —CH$_2$CH$_2$CH$_2$—, —CH$_2$CHCH$_3$—, —CH$_2$CH$_2$CH$_2$CH$_2$—, —CH$_2$CH(CH$_3$)CH$_2$—, —CH$_2$CH$_2$CH$_2$CH$_2$CH$_2$—, —CH$_2$CH$_2$CH$_2$CH$_2$CH$_2$CH$_2$—, —CH$_2$CH$_2$CH(CH$_2$CH$_3$)CH$_2$CH$_2$CH$_2$—, —CH$_2$CH$_2$CH$_2$CH$_2$CH$_2$CH$_2$CH$_2$CH$_2$—, and —CH$_2$CH$_2$CH$_2$CH$_2$CH$_2$CH$_2$CH$_2$CH$_2$CH$_2$CH$_2$—. The alkyl groups $R^2$ are as illustrated above for R. When $R^2$ is an alkyl group, it is typically methyl.

Some examples of suitable amino-functional hydrocarbon groups are; —CH$_2$CH$_2$NH$_2$, —CH$_2$CH$_2$CH$_2$NH$_2$, —CH$_2$CHCH$_3$NH, —CH$_2$CH$_2$CH$_2$CH$_2$NH$_2$, —CH$_2$CH$_2$CH$_2$CH$_2$CH$_2$NH$_2$,
—CH$_2$CH$_2$CH$_2$CH$_2$CH$_2$CH$_2$NH$_2$,     —CH$_2$CH$_2$NHCH$_3$,
—CH$_2$CH$_2$CH$_2$NHCH$_3$,    —CH$_2$(CH$_3$)CHCH$_2$NHCH$_3$,
—CH$_2$CH$_2$CH$_2$CH$_2$NHCH$_3$, —CH$_2$CH$_2$NHCH$_2$CH$_2$NH$_2$,
—CH$_2$CH$_2$CH$_2$NHCH$_2$CH$_2$NH$_2$,
—CH$_2$CH$_2$CH$_2$CH$_2$NHCH$_2$CH$_2$NH$_2$,
—CH$_2$CH$_2$CH$_2$CH$_2$NHCH$_2$CH$_2$CH$_2$NH$_2$,
—CH$_2$CH$_2$NHCH$_2$CH$_2$NHCH$_3$,
—CH$_2$CH$_2$CH$_2$NHCH$_2$CH$_2$CH$_2$NHCH$_3$,
—CH$_2$CH$_2$CH$_2$CH$_2$NHCH$_2$CH$_2$CH$_2$NHCH$_3$, and
—CH$_2$CH$_2$NHCH$_2$CH$_2$NHCH$_2$CH$_2$CH$_3$. Typically, the amino functional group is —CH$_2$CH$_2$CH$_2$NH$_2$.

The mercapto-functional organic group is designated in the formulas herein as R$^S$ and is illustrated by groups having the formula; —R$^1$SR$^2$, wherein each R$^1$ and R$^2$ is as defined above. The mercapto-functional group is illustrated by the following formulae;
CH$_2$CH$_2$CH$_2$SH,     —CH$_2$CH(CH$_3$)SH,
—CH$_2$CH$_2$CH$_2$CH$_2$SH,    —CH$_2$CH$_2$CH$_2$CH$_2$CH$_2$SH,
—CH$_2$CH$_2$CH$_2$CH$_2$CH$_2$CH$_2$SH, —CH$_2$CH$_2$SCH$_3$. Typically, the mercapto functional group is —CH$_2$CH$_2$CH$_2$SH.

The amino-mercapto functional organopolysiloxane comprises siloxy units having the average formula;

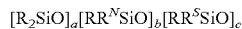

where; a is 1-4000, alternatively 1 to 1000, alternatively 1 to 200,
b is 1-1000, alternatively 1 to 100, alternatively 1 to 50,
c is 1-1000, alternatively 1 to 100, alternatively 1 to 50;
R is independently a monovalent organic group,
alternatively R is a hydrocarbon containing 1-30 carbon atoms,
alternatively R is a monovalent alkyl group containing 1-12 carbons, or
alternatively R is a methyl group;
R$^N$ is a monovalent amino functional organic group as defined above,
R$^S$ is a monovalent mercapto functional organic group as defined above.

The siloxy units in the formula [R$_2$SiO]$_a$[RR$^N$SiO]$_b$[RR$^S$SiO]$_c$ may be in any order, in other words, this formula does not imply any ordering of the designated siloxy units. Furthermore, the amino-mercapto organopolysiloxane may contain additional (R$_3$SiO$_{0.5}$), (R$_2$SiO), (RSiO$_{1.5}$), or (SiO$_2$) siloxy units. The amino-mercapto organopolysiloxane may be terminated with a hydroxy group (resulting in a silanol group on the terminal siloxy unit of the terpolymer), or with an alkyl group containing 1-30 carbon atoms (resulting in an alkoxy group on the terminal siloxy unit of the terpolymer). When an alkyl group is used, the alkyl group can be a linear or branched alkyl, containing 1-30 carbons, alternatively the alkyl group can be a long chain alkyl group of 4-20, alternatively 8-20 carbon atoms such as stearyl. Alternatively, the organopolysiloxane can be terminated with a trialkylsilyl group such as a trimethylsilyl group.

Representative, non-limiting, examples of average formulae that may represent the amino-mercapto organopolysiloxanes of the present invention include;
HO—[(CH$_3$)$_2$SiO]$_a$[(CH$_3$)R$^N$SiO]$_b$[(CH$_3$)R$^S$SiO]$_c$H
(CH$_3$)$_3$SiO[(CH$_3$)$_2$SiO]$_a$[(CH$_3$)R$^N$SiO]$_b$[(CH$_3$)R$^S$SiO]$_c$Si(CH$_3$)$_3$
HO[(CH$_3$)$_2$SiO]$_a$[(CH$_3$)R$^N$SiO]$_b$[(CH$_3$)R$^S$SiO]$_c$[(CH$_3$)SiO$_{1/2}$]$_d$H
HO[CH$_3$)$_2$SiO]$_a$[(CH$_3$)R$^N$SiO]$_b$[(CH$_3$)R$^S$SiO]$_c$[SiO$_2$]$_e$H
HO[(CH$_3$)$_2$SiO]$_a$[(CH$_3$)R$^N$SiO]$_b$[(CH$_3$)R$^S$SiO]$_c$[(CH$_3$)SiO$_{1/2}$]$_d$[SiO$_2$]$_e$H (CH$_3$)$_3$SiO[(CH$_3$)$_2$SiO]$_a$[(CH$_3$)R$^N$SiO]$_b$[(CH$_3$)R$^S$SiO]$_c$[(CH$_3$)SiO$_{1/2}$]$_d$[SiO$_2$]$_e$Si(CH$_3$)$_3$ where; a is 1-4000, alternatively 10 to 1000, alternatively 10 to 400,
b is 1-1000, alternatively 1 to 100, alternatively 1 to 50,
c is 1-1000, alternatively 1 to 100, alternatively 1 to 50;
d is 0-200, alternatively 1 to 100, alternatively 1 to 50;
e is 0-200, alternatively 1 to 100, alternatively 1 to 50;
and R$^N$ and R$^S$ are as defined above.

In one embodiment, the amino-mercapto organopolysiloxane may be represented by the following average formula example;

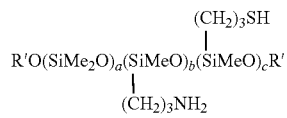

where; a is 1-4000, alternatively 10 to 1000, alternatively 10 to 400,
b is 1-1000, alternatively 1 to 100, alternatively 1 to 50,
c is 1-1000, alternatively 1 to 100, alternatively 1 to 50;
and R' is H, an alkyl group having 1 to 40 carbon atoms, or (CH$_3$)$_3$Si.

The amino-mercapto functional organopolysiloxanes of the present invention may also contain additional organofunctional groups. As used herein, "organofunctional group" means an organic group containing any number of carbon atoms, but the group contains at least one atom other than carbon and hydrogen. Representative examples of such organofunctional groups include, amines, amides, sulfonamides, quaternaries, ethers, epoxy, phenols, esters, carboxyls, ketones, halogen substituted alkyls and aryls group.

The amino-mercapto organopolysiloxanes of the present invention may be prepared by combining the components:

(A) a dialkoxydialkylsilane, (B) an amino functional alkoxy silane, and (C) a mercapto functional alkoxy silane, and optionally (D) an endblocker selected from an alcohol, monoalkoxysilane, or disilazane, and initiating a condensation reaction among the components. Typically, water is added to mixture of components (A), (B), and (C) to effect hydrolysis of the components to enhance the condensation reaction. The amount of water added may vary, but is typically 10 to 60 weight percent, alternatively 20 to 40 wt %, of the mixture with components (A), (B), and (C).

Other additives may be added to components (A), (B), and (C) to enhance reaction or improve resulting product quality. For example, compounds known to improve color or clarity such as ethylenediaminetetraacetic acid (EDTA) may be added to the reaction mixture.

The amount of such additives used in combination with components (A) to (D) may vary, but typically are an effective amount usually only 0.1 to 5 weight percent of the reaction mixture.

In one embodiment, the dialkoxydialkylsilane is first combined with water and optionally with EDTA. In this embodiment, the amino-mercapto functional polysiloxane may be prepared by:

I) heating a mixture of (A) a dialkoxydialkylsilane and water, then

II) adding (B) an amino functional alkoxy silane, and (C) a mercapto functional alkoxy silane, and optionally (D) an endblocker selected from an alcohol, monoalkoxysilane, or disilazane, and III) reacting the resulting mixture via a condensation reaction.

The condensation reaction typically involves the addition of a condensation catalyst. The condensation catalyst may be selected from any silanol condensation catalyst known in the art, and may either be an acid or base. The condensation catalyst may be a strong base, such as an alkaline metal hydroxide or a tin compound, used in combination with a phosphate, such as sodium orthophosphate. The catalyst may be an organic acid. Examples of the organic acids include acetic acid, propionic acid, butanoic acid, pentanoic acid, hexanoic acid, heptanoic acid, octanoic acid, nonanoic acid, decanoic acid, oxalic acid, maleic acid, maleic anhydride, methylmalonic acid, adipic acid, sebacic acid, gallic acid, butyric acid, mellitic acid, arachidonic acid, shikimic acid, 2-ethylhexanoic acid, oleic acid, stearic acid, linoleic acid, linolenic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, methanesulfonic acid, phthalic acid, fumaric acid, citric acid and tartaric acid. Examples of the inorganic acids include hydrochloric acid, nitric acid, sulfuric acid, hydrofluoric acid and phosphoric acid. The catalyst may also be a quaternary ammonium salt or a carboxylic acid, a Lewis acid or Lewis base. The condensation catalyst is usually added at 0.0005 to 5% w/w, alternatively, 0.001 to 1% weight percent based on the total reaction components.

Component (A) in the present process is a dialkoxydialkylsilane, which may be represented by the general formula; $R_2^2Si(OR^2)_2$, where Me is methyl and $R^2$ is an alkyl group containing 1 to 4 carbon atoms. Typically the dialkoxydialkylsilane is dimethoxydimethylsilane.

The amino functional alkoxy silane (B) contains an amino-functional organic group and at least one alkoxy group bonded to Si in the molecule. The amino-functional organic group may be selected from any of the amino-functional organic groups described above, as represented by $R^N$. Thus, the amino functional alkoxy silane (B) may be selected from those silane compounds having the formula;

$$R^3_h R^N_i Si(OR^4)_{[4-(h+i)]}$$

where h is 0, 1 or 2, i is 1 or 2, with the proviso that (h+i)≤3,
$R^3$ is a hydrocarbon group containing 1 to 30 carbon atoms,
$R^4$ is an alkyl group containing 1 20 carbon atoms.

Amino functional alkoxy silanes are known in the art, and many are available commercially.

Representative, non-limiting examples, of amino functional alkoxy silanes suitable a component (B) in the process of the present invention include;
$(CH_3O)_2(CH_3)Si(CH_2)_3NH_2$,
$(CH_3O)_2(CH_3)Si(CH_2)_4NH_2$,
$(CH_3O)_2(CH_3)Si(CH_2)_3NH(CH_2)_2NH_2$,
$(CH_3O)_2(CH_3)SiCH_2CH(CH_3)CH_2NH(CH_2)_2NH_2$,
$(CH_3O)_2(CH_3)SiCH_2CH(CH_3)CH_2NH(CH_2)_3NH_2$,
$(CH_3O)_2(CH_3)Si(CH_2)_3NH(CH_2)_2NH(CH_2)_2NH_2$,
$(CH_3O)_2(CH_3)Si(CH_2)_3NH(CH_2)_4NH_2$,
$(CH_3O)_2(CH_3)Si(CH_2)_3O(CH_2)_2NH_2$, and similar ethoxy $(C_2H_5O)$ silanes.

The amino functional alkoxy silane (B) may also be a mixture of two or more independent amino functional alkoxy silanes as described above.

The mercapto functional alkoxy silane (C) contains an mercapto-functional organic group, and may be selected from any of the above mercapto functional organic groups, as designated above as $R^S$ above. Thus, the mercapto functional alkoxy silane (C) may be selected from those silane compounds having the formula;

$$R^3_h R^S_i Si(OR^4)_{[4-(h+i)]}$$

where h is 0, 1 or 2, i is 1 or 2, with the proviso that (h+i)≤3,
$R^S$ is a mercapto functional organic group as defined above,
$R^3$ is a hydrocarbon group containing 1 to 30 carbon atoms,
$R^4$ is an alkyl group containing 1-20 carbon atoms.

Mercapto functional alkoxy silanes are known in the art, and many are available commercially.

Representative, non-limiting examples, of mercapto functional alkoxy silanes suitable a component (C) in the process of the present invention include;
$(C_2H_5O)_2(CH_3)SiCH_2CH_2CH_2SH$,
$(C_2H_5O)_2(CH_3)SiCH_2CH(CH_3)SH$,
$(C_2H_5O)_2(CH_3)SiCH_2CH_2CH_2CH_2SH$,
$(C_2H_5O)_2(CH_3)SiCH_2CH_2CH_2CH_2CH_2SH$,
$(C_2H_5O)_2(CH_3)SiCH_2CH_2CH_2CH_2CH_2CH_2SH$,
$(C_2H_5O)_2(CH_3)SiCH_2CH_2SCH_3$
$(C_2H_5O)_3SiCH_2CH_2CH_2SH$,
$(C_2H_5O)_3SiCH_2CH(CH_3)SH$,
$(C_2H_5O)_3SiCH_2CH_2CH_2CH_2SH$,
$(C_2H_5O)_3SiCH_2CH_2CH_2CH_2CH_2SH$,
$(C_2H_5O)_3SiCH_2CH_2CH_2CH_2CH_2CH_2SH$,
$(C_2H_5O)_3SiCH_2CH_2SCH_3$, and corresponding methoxy based silanes.

Optionally, an endblocker (D) selected from an alcohol, monoalkoxysilane, or disilazane is co-reacted with components (A), (B), and (C) with suitable catalysts. The alcohol tends to become incorporated in the organopolysiloxane as an end-blocking alkoxy group. Although not wishing to be bound by any theory, the present inventors believe the reaction between the alcohol group and Si—OH groups is much slower than that between Si-alkoxy groups and Si—OH groups, but is sufficiently fast that the alcohol acts as a modifier of molecular weight. In the absence of an alcohol or any other chain-stopping reagent, high molecular weight hydroxyl terminated amino-mercapto organopolysiloxanes are produced. The alcohol can be an aliphatic alcohol having 8 to 30 carbon atoms, for example n-octanol, n-decanol, octadecanol, cetyl alcohol or a commercial mixture of linear and branched 12-16 C alcohols. Such high molecular weight aliphatic alcohols are preferred when producing a clear liquid reaction product using an aliphatic carboxylic acid having 6 to 20 carbon atoms. Alternatively, the alcohol (D) may be an ether alcohol, for example 2-methoxypropanol or 2-butoxyethanol or a hydroxy-terminated polyether, for example a polyethoxylated fatty alcohol or a polypropylene glycol monoether.

Alternatively, a monoalkoxysilane $ROSiR_3$, where R is a monovalent organic group, may be co-reacted with the aminosilane (B), the dialkoxydialkylsilane (A), and the mercaptosilane (C) in the presence of a suitable catalyst. The $R_3Si$ group becomes incorporated in the mercapto containing amino-functional polysiloxane as an end-blocking group. Alternatively, the endblocker may be a disilazane such as hexamethydisilazane.

The amounts of components (A), (B), (C), and optionally (D) may be varied to produce amino-mercapto functional organopolysiloxanes having a range of molecular weights and varying amounts of amino and mercapto functional groups present in the organopolysiloxane. As discussed above, the amount of (D) added controls the overall molecular weight or degree of polymerization of the amino-mercapto organopolysiloxane. Typically the molar amounts of components (A), (B), and (C) are selected such to provide a molar percentage of each to be;
(A) 1 to 99.5, alternatively 10 to 60, or alternatively 30 to 40,
(B) 0.5 to 60, alternatively 10 to 40, or alternatively 20 to 30,
(C) 0.5 to 60, alternatively 10 to 40, or alternatively 20 to 30,
where (A)+(B)+(C) sums to 100%.

The molar ratio of [(B)+(C)]/[(A)+(B)+(C)] may vary from 0.05 to 1, alternatively 0.5 to 1, or alternatively 0.9 to 1.

The reaction between the dialkoxydialkylsilane (A), aminosilane (B) and the mercaptosilane (C) may be carried out at any temperature in the range 0-200° C. Temperatures of at least 50° C. are preferred, most preferably from 60° C. up to 120 or 140° C. The reaction may be carried out at pressures in the range from 5 mbar up to 5 bar, for example at ambient pressure; it is frequently preferred that at least the later part of the reaction is carried out under reduced pressure, for example 10 to 400 mbar, particularly if there is a need to promote removal of volatile by-product from the reaction system.

The reaction between the aminosilane, dialkoxydialkylsilane and the mercaptosilane may be carried out undiluted in the liquid phase, or alternatively in a solvent.

The reaction between the dialkoxydialkylsilane (A), aminosilane (B) and mercaptosilane (C) can if desired be carried out in the presence of a liquid organic or silicone non-reactive diluent. A preferred diluent is a non-reactive polysiloxane having a viscosity of less than 375 mPas, for example 5 to 100 mPa·s. Examples of such polysiloxanes include hexamethyldisiloxane, octamethyltrisiloxane, decamethyltetrasiloxane, dodecamethylpentasiloxane, tetradecamethylhexasiloxane or hexadecamethylheptasiloxane, octamethylcyclotetrasiloxane, decamethylcyclopentasiloxane or dodecamethylcyclohexasiloxane, heptamethyl-3-{(trimethylsilyl)oxy}-trisiloxane (M3T), hexamethyl-3,3,bis { (trimethylsilyl)oxy} trisiloxane (M4Q) or pentamethyl {(trimethylsilyl)oxy} cyclotrisiloxane, or a non-reactive, for example trimethylsilyl-terminated, polydimethylsiloxane. Cyclic polysiloxanes having at least 5 silicon atoms, especially decamethylcyclopentasiloxane (D5), are particularly preferred. Alternatively, an organic solvent may be used. The organic solvent may be an aliphatic or aromatic hydrocarbon.

The liquid organic or silicone non-reactive diluent can be present from the start of the reaction or can be added during the reaction. Use of the non-reactive diluent allows the production of easily handled compositions containing amino-mercapto functional organopolysiloxanes of high molecular weight and high viscosity. Amino-mercapto functional organopolysiloxanes of viscosity above 10 Pa·s, preferably above 20 Pa·s, and up to 100 Pa·s or more can be prepared as solutions or dispersions of viscosity suitable for application in textiles. Where the non-reactive diluent is a silicone, the product is generally a solution of the amino-mercapto functional organopolysiloxane. These high viscosity amino-mercapto functional organopolysiloxanes are particularly effective in conditioning as fiber lubricants. When producing high molecular weight amino-mercapto functional organopolysiloxanes, it may be preferred to remove some reagent during the later stages of preparation. For example, the dialkoxydialkylsilane (A), aminosilane (B) and meracptopropylsilane (C) can initially be reacted in the presence of an alcohol which acts as a chain terminating agent. A silicone non-reactive diluent can be added during the reaction. The reaction can then be continued to increase the chain length of the amino-mercapto functional organopolysiloxane. Such continued reaction can for example be at increased temperature and/or reduced pressure to promote removal of the alcohol. The amount of liquid organic or silicone non-reactive diluent present can for example be from 10 to 2000%, preferably 20 to 500% by weight based on the total weight of aminosilane (A) and dialkoxydialkylsilane (B) and mercaptosilane (C). The resulting solution of amino-mercapto functional organopolysiloxane in non-reactive diluent can be further diluted for use if required.

The amino-mercapto functional organopolysiloxanes are also useful as a reactant with fluorocarbons to prepare a fluorosilicone compounds for imparting oil repellent properties (oleophobicity) to the textile with improved hand.

EXAMPLES

The following examples are presented to further illustrate the compositions and methods of this invention, but are not to be construed as limiting the invention. All parts and percentages in the examples are on a weight basis and all measurements were obtained at about 23° C., unless indicated to the contrary.

Example 1 (Comparative)

A premix was prepared in a nitrogen purged glass bottle with the following ingredients;

| | | |
|---|---|---|
| 1. | Silanol terminated polydimethyl siloxane (Mn~900) | 416.2 grams |
| 2. | mercaptopropyl methyl dimethoxy silane | 130.3 grams |
| 3. | Aminopropyl methyl dimethoxy silane | 15.28 grams |
| 4. | Trimethyl Ethoxy Silane | 27.14 grams |

The premix formed a homogeneous clear/colorless mixture with a viscosity of <10 centipoise. The premix was stored at ambient temperature for several days and no color or viscosity change was noted. A heated and stirred 3-necked round bottomed flask equipped with an overhead condenser and receiver was charged with 587.04 grams of premix and 1.416 grams of Octanoic Acid (CAS #124-07-2). A J-KEM Scientific™ Gemini temperature controller was used to control the electric heating mantel on the bottoms and monitor the temperature of the overheads with J type thermocouples in glass thermo wells. The pot temperature was raised from 20° to 85° C. over a 4 hr. period. The pressure was maintained at 763 mm Hg using a nitrogen bubbler with a flow rate of nitrogen less than 10 cc's per minute. A slow accumulation of volatiles in the receiver began at a pot temperature of 83.5° C. and an overhead temperature of 64° C. The pot pressure was reduced to 35 mm hg over a 45 minute period during which the pot temperature was maintained at 85° C. and the overhead temperature was reduced to 49° C. Pressure was increased to 763 mm Hg with nitrogen and 51 grams of volatiles were removed from the receiver. The pot material had a viscosity of 15.38 centistokes. The pot pressure was reduced to 35 mm hg over a one hour period during which the pot temperature was maintained at 85° C. and the overhead temperature was reduced to 40° C. Pressure was increased to 763 mm Hg with nitrogen and 27 grams of volatiles were removed from the receiver. The pot material had a viscosity of 21.2 centistokes. The pot pressure was reduced to 35 mm hg over a one hour period during which the pot temperature was maintained at 85° C. and the overhead temperature was reduced to 32° C. Pressure was increased to 763 mm Hg with nitrogen and 30 grams of volatiles were removed from the receiver. The pot material had a viscosity of 35.85 centistokes. The pot pressure was reduced to 35 mm Hg over a 1½ hour period during which the pot temperature was maintained at 85° C. and the overhead temperature was reduced to 37° C. Pressure was increased to 763 mm Hg with nitrogen and 34 grams of volatiles were removed from the receiver. The pot material was clear and colorless and had a viscosity of 60.45 centistokes.

Example 2

A premix was prepared in a nitrogen purged glass bottle with the following ingredients;

| | | |
|---|---|---|
| 1. | Dimethyl Dimethoxy Silane | 626.7 grams |
| 2. | mercapto propyl methyl dimethoxy silane | 129.6 grams |
| 3. | Amino propyl methyl dimethoxy silane | 15.13 grams |
| 4. | Trimethyl Ethoxy Silane | 27.38 grams |

The premix formed a homogeneous clear/slightly pink mixture with a viscosity of <10 centipoise. The premix was stored at ambient temperature for several hours and no viscosity change was noted while the light pink tint was persistent. A heated and stirred 3-necked round bottomed flask equipped with an overhead condenser and receiver was charged with 795.53 grams of premix and 372.09 grams of tap water. The pot temperature was raised from 20° to 85° C. over a 4 hour period. The pressure was maintained at 763 mm Hg using a nitrogen bubbler with a flow rate of nitrogen less than 10 cc's per minute. The accumulation of volatiles in the receiver was steady and the pot contents remained hazy during heating. After 4 hours of heating, 440.33 grams of volatiles were removed. The pot pressure was reduced from 762 mm hg 100 mm Hg over a one hour period during which the pot temperature was maintained at 85° C. and the overhead temperature was reduced to 82° C. Pressure was increased to 763 mm Hg with nitrogen and 190.03 grams of volatiles were removed from the receiver. The pot material had a viscosity of 27.73 centistokes and the haze had disappeared to generate a clear homogeneous polymer solution to which was added 1.406 grams of Octanoic Acid. The pot pressure was reduced to 35 mm hg over a one hour period during which the pot temperature was maintained at 85° C. and the overhead temperature was reduced to 35° C. Pressure was increased to 763 mm Hg with nitrogen and the pot was sampled and the viscosity was 32.75 centistokes. Pressure was reduced to 35 mm Hg and held for ¾ hour the pot temperature was maintained at 85° C. and the overhead temperature was reduced to 41° C. Pressure was increased to 763 mm Hg with nitrogen and 15.74 grams of volatiles were removed from the receiver. Trimethyl Ethoxy Silane (4.708 grams) was added to the pot and temperature was maintained at 85° C. with pressure at 763 mm Hg with nitrogen for one hour. Pot contents were slightly hazy and tan colored after filtration with a 0.45 micron syringe filter color and haze did not change. Finished material was slightly hazy with a light tan color and a viscosity of 54.216 centistokes.

Example 3

A premix was prepared in a nitrogen purged, heated and stirred 3-necked round bottomed flask equipped with an overhead condenser and receiver with the following ingredients;

| | | |
|---|---|---|
| 1. | Dimethyl Dimethoxy Silane (Distilled) | 799.94 grams |
| 2. | Heptane | 30.03 grams |
| 3. | mercapto propyl methyl dimethoxy silane | 165.51 grams |

-continued

| | | |
|---|---|---|
| 4. | Amino propyl methyl dimethoxy silane | 19.41 grams |
| 5. | Hexamethyl Disilazane | 23.47 grams |
| 6. | Deionized Water | 400.44 grams |

The premix formed a two phase mixture that was hazy with stirring. The mixture was hated to 40° C. over 10 minutes and 1.69 grams of Octanoic acid were added. Flask was heated to 50° C. and held for ½ hour and allowed to cool overnight. The next morning a two component mixture was noted with hazy top layer. The flask contents were heated to 85° C. over a 1½ hour period and material began collecting in the receiver at a pot temperature of 71.3° C. The receiver was emptied and 584.94 grams of volatiles were removed. The pot contents were transferred to vacuum flash set-up. This set-up utilized a J-Kem® Scientific Infinity controller to regulate vacuum level and a J-Kem® Scientific Gemini controller to regulate temperature. Over a one hour period temperature was ramped from 40° C. to 87° C. and Vacuum was ramped from 721 to 74 mm Hg. Vacuum was broken with nitrogen and 215.9 grams of volatiles were removed. Over a two hour period temperature was controlled at 85° C. and Vacuum was ramped from 721 to 33.5 mm Hg. Vacuum was broken with nitrogen and 9.71 grams of volatiles were removed. Over a two hour period temperature was controlled at 85° C. and Vacuum was ramped from 721 to 33.1 mm Hg. Vacuum was broken with nitrogen and 3.4 grams of hexamethyl Disilazane were added. Temperature was controlled at 85° C. for one hour with pressure at 750.4 mm Hg with <10 cc/min. $N_2$ flow through dry ice traps to a nitrogen bubbler. Heat was turned off overnight and the next morning 2.71 grams of volatiles were recovered from the receiver and 44.41 grams of volatiles were recovered from the dry ice traps. Recovery from the pot was 483.3 grams of clear product which had a viscosity of 67.63 centistokes.

Example 4

A 3-necked round bottomed flask equipped with an overhead condenser and receiver was charged with the following ingredients;

| | | |
|---|---|---|
| 1. | Dimethyl Dimethoxy Silane | 879.61 grams |
| 2. | Versene ™ 100 | 0.803 grams |
| 3. | Tap water | 26.40 grams |

The contents formed a slightly yellow; two phase mixture that was hazy with stirring. The mixture was heated to 50° C. over 20 minutes and the following materials were added:

| | | |
|---|---|---|
| 1. | Hexamethyldisilazane | 29.42 grams |
| 2. | Amino propyl methyl dimethoxy silane | 20.91 grams |
| 3. | Mercapto propyl methyl dimethoxy silane | 154.27 grams |

The mixture turned to a slight red color that disappeared quickly upon addition of 391.97 grams of tap water. The mixture was heated to 60° C. and held for two hours and 1.902 grams of Octanoic Acid were added. The heat was turned off and the mixture was allowed to cool with stirring overnight. The next morning 23.37 grams of volatiles were removed from the receiver. The pot was heated to 85° C. over two hour period at atmospheric pressure. The overhead temperature rose to 85° C. over the two hour period and after two hours at 85° C. 610.17 grams of hazy volatiles were removed from the receiver. The pressure was reduced to 75 mm Hg over a ½ hour period while the pot temperature was maintained at 85° C. Vacuum was broken with nitrogen and 206.58 grams of volatiles were removed from the receiver. Pot temperature was increased to 90° C. and pressure was reduced to 35 mm of Hg for 1¼ hours. Vacuum was broken with nitrogen and heat was turned off. The pot was sampled a water white clear material with a viscosity of 28.96 centistokes was obtained. Material was allowed to stir with a nitrogen bubbler over the week end and 5.91 grams of volatiles were removed from the receiver (3 days). Pot temperature was increased to 85° C. and pressure was reduced to 30 mm Hg for two hours. Vacuum was broken with nitrogen and material was filtered with 5 micron filter water white clear material with a viscosity of 41.1 centistokes was obtained. 5.22 grams of Hexamethyldisilazane were added and pressure was reduced to 29 mm Hg while maintaining pot temperature at 85° C. for one hour. Vacuum was broken with nitrogen and heat was turned off. The pot was sampled and 515.71 grams water white clear material with a viscosity of 55.79 centistokes was obtained.

Example 5

A 3-necked round bottomed flask equipped with an overhead condenser and receiver was charged with the following ingredients;

| 1. | Dimethyl Dimethoxy Silane(not distilled) | 1194.63 grams |
| 2. | Versene ™ 100 | 1.072 grams |
| 3. | Tap water | 10.039 grams |

The contents formed a slightly yellow; two phase mixture that was hazy with stirring. The mixture was heated to 45° C. over one hour and the following materials were added:

| 1. | Hexamethyldisilazane | 45.57 grams |
| 2. | Amino propyl methyl dimethoxy silane | 26.534 grams |
| 3. | Mercapto propyl methyl dimethoxy silane | 198.26 grams |
| 4. | Octanoic Acid | 2.325 grams |
| 5. | Tap water | 573.86 grams |

A colorless two phase mixture was produced. Temperature was increased to 62° C. and after 4.5 hours a hazy white mixture was formed. 6.11 grams of volatiles were removed from the receiver and temperature was increased to 85° C. After 4 four hours at 85° C., 798.38 grams of volatiles were removed from the receiver. The pot contents were cooled to room temperature and a vacuum flash was set-up. This set-up utilized a J-Kem® Scientific Infinity controller to regulate vacuum level and a J-Kem® Scientific Gemini controller to regulate temperature. Over a one hour period temperature was ramped from 20.6° C. to 87° C. and Vacuum was ramped from 720 to 88.9 mm Hg. Vacuum was broken with nitrogen and 335.68 grams of volatiles were removed. Over a two hour period temperature was controlled at 85° C. and Vacuum was ramped from 720 to 34.2 mm Hg. Vacuum was broken with nitrogen and 7.85 grams of volatiles were removed from receiver. 99.47 grams of tap water were added to the pot and the temperature was ramped from 72.9° C. to 88.3° C. and pressure was ramped from 720 to 34.4 mm Hg over a 30 minute period. Vacuum was broken with nitrogen and 88.38 grams of volatiles were removed from receiver. 95.76 grams of tap water were added to the pot and the temperature was ramped from 77.7° C. to 88.1° C. and pressure was ramped from 720 to 34.4 mm Hg over a one hour period. Vacuum was broken with nitrogen and 84.41 grams of volatiles were removed from receiver. 95.73 grams of tap water were added to the pot and the temperature was ramped from 77.1° C. to 84.5° C. and pressure was ramped from 720 to 34.4 mm Hg over a 30 minute period. Vacuum was broken with nitrogen and 99.05 grams of volatiles were removed from receiver. 99.14 grams of tap water were added to the pot and the temperature was ramped from 73.7° C. to 86.5° C. and pressure was ramped from 720 to 34.6 mm Hg over a 40 minute period. Vacuum was broken with nitrogen and 90.67 grams of volatiles were removed from receiver. Pot temperature was controlled at 88° C. and pressure was controlled at 34.4 mm Hg for one hour and the pot was sampled viscosity 64.8 centistokes. The pot was cooled to room temperature and 6.58 grams of trimethyl ethoxy silane were added. The pot was heated to 65° C. for 30 minutes and pot contents were filtered thru a 1.2 micron filter. A total of 763.45 grams or product was obtained as a colorless clear liquid with a viscosity of 77.3 centistokes.

The invention claimed is:

1. A process for the preparation of an amino-mercapto functional polysiloxane comprising reacting:
   (A) a dialkoxydialkylsilane,
   (B) an amino functional alkoxy silane, and
   (C) a mercapto functional alkoxy silane, and optionally
   (D) an endblocker selected from an alcohol, monoalkoxysilane, or disilazane via a condensation reaction.

2. The process of claim 1 wherein the amino-mercapto functional organopolysiloxane comprises siloxy units having the average formula;

where; a is 1-4000, b is 1-1000, c is 1-1000,
   R is independently a monovalent organic group,
   $R^N$ is a monovalent amino functional organic group, and
   $R^S$ is a monovalent mercapto functional organic group.

3. The process of claim 2 wherein the amino-mercapto functional organopolysiloxane has the average formula;

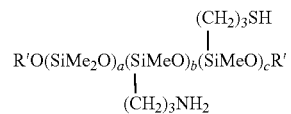

where a is 1-4000, b is 1-1000, c is 1-1000,
   R' is H, an alkyl group having 1 to 40 carbon atoms, or Me₃Si.

4. The process of claim 3 where a is 1-200, b is 1-50, c is 1-50, and R' is an alkyl group having 1 to 20 carbon atoms.

5. The process of claim 1 where the molar amounts of components (A), (B), and (C) are selected such to provide a molar percentage of each to be;
   (A) 1 to 99.5,
   (B) 0.5 to 60,
   (C) 0.5 to 60,
where (A)+(B)+(C) sums to 100%.

6. The process of claim 1 where the dialkoxydialkylsilane is dimethoxydimethylsilane.

7. The process of claim 1 wherein the amino functional alkoxy silane has the formula

where h is 0, 1 or 2,
  i is 1 or 2, with the proviso that (h+i)≤3,
  $R^N$ is an amino functional organic group,
  $R^3$ is a hydrocarbon group containing 1 to 30 carbon atoms,
  $R^4$ is an alkyl group containing 1-20 carbon atoms.

8. The process of claim 1 wherein the amino functional alkoxy silane is selected from;
  $(CH_3O)_2(CH_3)Si(CH_2)_3NH_2$,
  $(CH_3O)_2(CH_3)Si(CH_2)_4NH_2$,
  $(CH_3O)_2(CH_3)Si(CH_2)_3NH(CH_2)_2NH_2$,
  $(CH_3O)_2(CH_3)SiCH_2CH(CH_3)CH_2NH(CH_2)_2NH_2$,
  $(CH_3O)_2(CH_3)SiCH_2CH(CH_3)CH_2NH(CH_2)_3NH_2$,
  $(CH_3O)_2(CH_3)Si(CH_2)_3NH(CH_2)_2NH(CH_2)_2NH_2$,
  $(CH_3O)_2(CH_3)Si(CH_2)_3NH(CH_2)_4NH_2$, or
  $(CH_3O)_2(CH_3)Si(CH_2)_3O(CH_2)_2NH_2$.

9. The process of claim 1 wherein the mercapto functional, alkoxy silane has the formula;

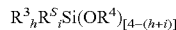

where h is 0, 1 or 2, i is 1 or 2, with the proviso that (h+i)≤3,
  $R^S$ is a mercapto functional organic group,
  $R^3$ is a hydrocarbon group containing 1 to 30 carbon atoms,
  $R^4$ is an alkyl group containing 1-20 carbon atoms.

10. The process of claim 1 wherein the mercapto functional silane is selected from
  $(C_2H_5O)_2(CH_3)SiCH_2CH_2CH_2SH$,
  $(C_2H_5O)_2(CH_3)SiCH_2CH(CH_3)SH$,
  $(C_2H_5O)_2(CH_3)SiCH_2CH_2CH_2CH_2SH$,
  $(C_2H_5O)_2(CH_3)SiCH_2CH_2CH_2CH_2CH_2SH$,
  $(C_2H_5O)_2(CH_3)SiCH_2CH_2CH_2CH_2CH_2CH_2SH$,
  $(C_2H_5O)_2(CH_3)SiCH_2CH_2SCH_3$
  $(C_2H_5O)_3SiCH_2CH_2CH_2SH$,
  $(C_2H_5O)_3SiCH_2CH(CH_3)SH$,
  $(C_2H_5O)_3SiCH_2CH_2CH_2CH_2SH$,
  $(C_2H_5O)_3SiCH_2CH_2CH_2CH_2CH_2SH$,
  $(C_2H_5O)_3SiCH_2CH_2CH_2CH_2CH_2CH_2SH$, or
  $(C_2H_5O)_3SiCH_2CH_2SCH_3$.

11. A process for the preparation of an amino-mercapto functional polysiloxane comprising
  I) heating a mixture of (A) a dialkoxydialkylsilane and water, then
  II) adding (B) an amino functional alkoxy silane, and (C) a mercapto functional alkoxy silane, and optionally (D) an endblocker selected from an alcohol, monoalkoxysilane, or disilazane, and III) reacting the resulting mixture via a condensation reaction.

12. The process of claim 11 wherein step I further comprises the addition of ethylenediaminetetraacetic acid.

* * * * *